United States Patent
Sundararajan et al.

(10) Patent No.: US 9,378,003 B1
(45) Date of Patent: Jun. 28, 2016

(54) COMPILER DIRECTED CACHE COHERENCE FOR MANY CACHES GENERATED FROM HIGH-LEVEL LANGUAGE SOURCE CODE

(75) Inventors: Prasanna Sundararajan, San Jose, CA (US); Andrew R. Putnam, Seattle, WA (US); Jeffrey M. Mason, Eldorado Springs, CA (US)

(73) Assignee: XILINX, INC., San Jose, CA (US)

( * ) Notice: Subject to any disclaimer, the term of this patent is extended or adjusted under 35 U.S.C. 154(b) by 1974 days.

(21) Appl. No.: 12/508,437

(22) Filed: Jul. 23, 2009

(51) Int. Cl.
*G06F 9/45* (2006.01)

(52) U.S. Cl.
CPC .............. *G06F 8/4441* (2013.01); *G06F 8/443* (2013.01)

(58) Field of Classification Search
CPC ...................................................... G06F 8/4441
USPC ........................................................ 717/151
See application file for complete search history.

(56) References Cited

U.S. PATENT DOCUMENTS

| | | | |
|---|---|---|---|
| 6,370,622 B1 | 4/2002 | Chiou et al. | |
| 6,631,447 B1 | 10/2003 | Morioka et al. | |
| 7,017,014 B2 | 3/2006 | Cuomo et al. | |
| 7,315,991 B1 | 1/2008 | Bennett | |
| 7,325,232 B2 | 1/2008 | Liem | |
| 7,664,928 B1* | 2/2010 | Andrews et al. | 712/14 |
| 7,689,972 B2 | 3/2010 | Sah et al. | |
| 7,784,037 B2 | 8/2010 | Chen et al. | |
| 8,180,964 B1 | 5/2012 | Koh et al. | |
| 2003/0187935 A1 | 10/2003 | Agarwalla et al. | |
| 2004/0030832 A1 | 2/2004 | Squibbs | |
| 2004/0073630 A1 | 4/2004 | Copeland et al. | |
| 2004/0148474 A1 | 7/2004 | Cuomo et al. | |
| 2005/0055675 A1 | 3/2005 | Neifert et al. | |
| 2005/0204316 A1 | 9/2005 | Nebel et al. | |
| 2005/0251657 A1* | 11/2005 | Boucher | 712/218 |
| 2006/0136664 A1* | 6/2006 | Trika | 711/113 |
| 2007/0047126 A1* | 3/2007 | Kobayashi et al. | 360/60 |
| 2007/0261042 A1 | 11/2007 | Chen et al. | |
| 2008/0127146 A1 | 5/2008 | Liao et al. | |
| 2008/0155574 A1 | 6/2008 | Gohel et al. | |
| 2008/0177975 A1* | 7/2008 | Kawamura | 711/173 |

(Continued)

OTHER PUBLICATIONS

U.S. Appl. No. 12/009,272, filed Jan. 16, 2008, Sundararajan et al.

(Continued)

*Primary Examiner* — Henry Tsai
*Assistant Examiner* — John Roche
(74) *Attorney, Agent, or Firm* — LeRoy D. Maunu

(57) ABSTRACT

Approaches for generating and operating an electronic system. High-level language (HLL) source code is compiled into equivalent intermediate language program code. The compilation determines a plurality of caches for storing data referenced by the HLL source. Flush instructions are inserted in the intermediate language program. Each flush instruction references one of caches and is inserted in the intermediate language program immediately following an instruction that is last to write to that cache. The intermediate language program is translated into a hardware description that specifies the plurality of caches, circuits for processing data in the caches, and for each of the caches a flush interface that initiates writing data from the cache to a main memory in response to a flush signal. The timing of the respective flush signal is determined based on placement of one of the one or more flush instructions in the intermediate language program.

20 Claims, 13 Drawing Sheets

(56) References Cited

U.S. PATENT DOCUMENTS

| | | |
|---|---|---|
| 2008/0229291 A1 | 9/2008 | Chen et al. |
| 2008/0307332 A1 | 12/2008 | Hayles et al. |
| 2009/0106256 A1* | 4/2009 | Safari et al. .................... 707/10 |
| 2010/0153654 A1 | 6/2010 | Vorbach et al. |

OTHER PUBLICATIONS

U.S. Appl. No. 12/508,404, filed Jul. 23, 2009, Sundararajan et al.

Ang, Boon Seong et al., *Acres Architecture and Compilation*, HPL-2003-209(R.1), Apr. 2, 2004, pp. 1-82, available from Hewlett Packard Company, Palo Alto, California, USA.

Putnam, Andrew et al., "CHiMPS: A High-Level Compilation Flow for Hybrid CPU/FPGA Architectures," *Proc. of the 16th International ACM/SIGDA Symposium on Field-Programmable Gate Arrays*, Feb. 24-26, 2008, pp. 261-269, Monterey, California, USA.

* cited by examiner

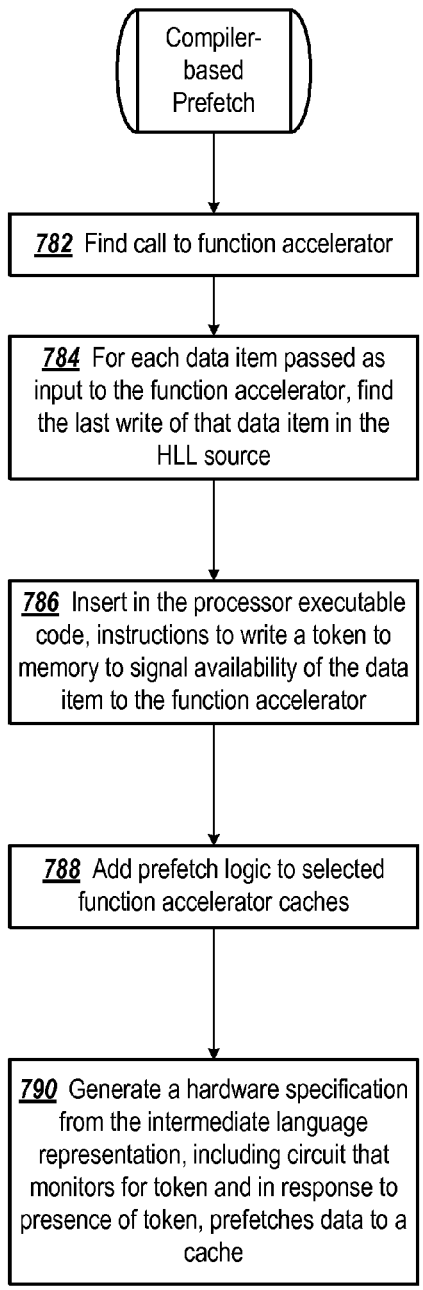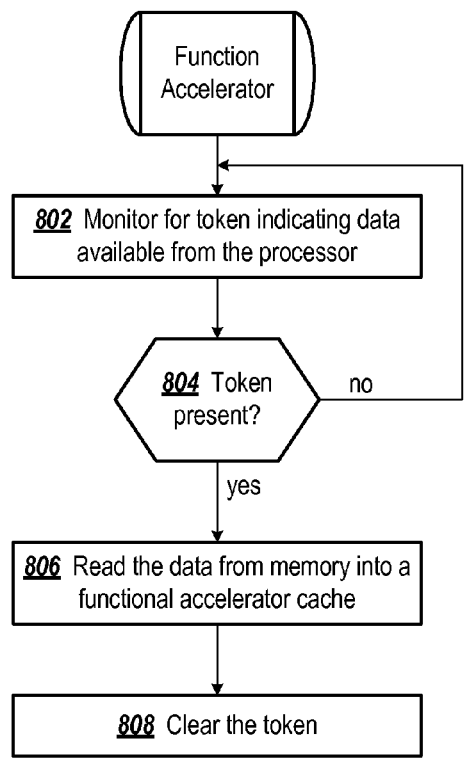
FIG. 12
FIG. 11

COMPILER DIRECTED CACHE COHERENCE FOR MANY CACHES GENERATED FROM HIGH-LEVEL LANGUAGE SOURCE CODE

FIELD OF THE INVENTION

The present invention generally relates to optimizing cache coherence for a distributed cache in a system that is partly implemented as software executing on a processor having built-in cache coherence, and partly implemented as circuitry on hardware with compiler-generated cache coherence.

BACKGROUND

High-performance computing (HPC) systems often include a general purpose processor executing program code in combination with a specialized co-processor or hardware accelerator performing some function(s) on behalf of the general purpose processor. The HPC system may realize improved performance as a result of the specialized co-processor or hardware accelerator performing the function(s) instead of the general purpose processor executing code to perform the function(s).

The specialized co-processor and hardware accelerator are referred to generically herein as function accelerators. Depending on application requirements, the function accelerator may take the form of a graphics processing unit, a floating point unit, a single instruction multiple data (SIMD) vector unit, a function implemented as a digital circuit (without software) on an ASIC or in programmable logic such a field programmable gate array (FPGA).

In some development environments both the functions to be performed by the general purpose processor and the function(s) to be performed by the function accelerator may be specified in a high-level language (HLL) such as Fortran, C, C++, or JAVA®, for example. The high-level program is partitioned into parts to be implemented as software for the general purpose processor and parts to be implemented on the function accelerator. The parts to be implemented as software for the general purpose processor are compiled using a compiler suitable for the language and the target general purpose processor. A compiler that targets a co-processor may be used for a co-processor implementation, while a more specialized tool suite may be used to generate a hardware accelerator that performs the desired function(s). U.S. Pat. No. 7,315,991, entitled "Compiling HLL into Massively Pipelined Systems," by Bennett, which is herein incorporated by reference in its entirety, describes one approach for generating a hardware accelerator from an HLL program.

In HPC applications, data in a shared memory space is processed by both the software executing on the general purpose processor and by the function accelerator. The software executing on the general purpose processor may depend on data from the function accelerator, and the function accelerator may depend on data processed by the software. Due to latency in the transferring of data processing delays may occur and reduce system throughput.

The present invention may address one or more of the above issues.

SUMMARY

The various embodiments of the invention provide a number of approaches for generating a specification of a distributed cache system and for operating the system. Further embodiments are directed to a distributed cache system. In one embodiment, a method is provided for generating an electronic system specification from high-level language (HLL) source code. The method includes compiling at least part of the HLL source code into an intermediate language program equivalent to the part of the HLL source code. The compiling includes determining from the HLL source code a plurality of caches for storing data referenced by the HLL source. One or more flush instructions are inserted in the intermediate language program. Each flush instruction references one of caches and is inserted in the intermediate language program immediately following an instruction that is last to write to the one of the caches. The method further includes translating the intermediate language program into a hardware description that specifies the plurality of caches, circuits for processing data in the caches, and for each of the caches a flush interface that initiates writing data from the cache to a memory structure in response to a respective flush signal. The timing of the respective flush signal as specified in the hardware description is determined based on placement of one of the one or more flush instructions in the intermediate language program.

A method for operating an electronic system is provided in another embodiment. The method includes executing software on a processor where the software includes a call to a hardware function and accesses an address space. The hardware function is initiated on a function accelerator in response to the call to the hardware function by the software. Data accessed by the hardware function are stored in a plurality of caches on the function accelerator, with each cache being dedicated to a particular region of the address space. For each of the plurality of caches to which the hardware function stores data, a respective flush signal is generated in response to a last store of a data item in the cache by the hardware function. In response to a respective flush signal to one of the plurality of caches, data are transferred from the one of the caches to a memory that is accessible to the software executing on the processor.

In another embodiment, an electronic system with a distributed cache architecture is provided. The system includes a processor having a processor-local cache and a main memory coupled to the processor. The main memory is configured with software that is executable by the processor. The software includes a call to a hardware function and accesses an address space. A function accelerator is coupled to the main memory and is configured to implement the hardware function and a plurality of caches. Each cache is dedicated to a particular region of the address space and includes a flush interface that initiates transferring data from the cache to a memory structure in response to a respective flush signal that indicates writing of the data to the cache by the hardware function is complete. The flush interface is configured to signal to the software when the transfer is complete.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings, in which:

FIG. 11 is a flowchart of an example process for optimizing cache performance by way of software executing on the processor signaling to a cache on the function accelerator that data may be prefetched from main memory to the cache on the function accelerator;

FIG. 12 is a flowchart of an example process performed by prefetch logic for a cache on the function accelerator;

DETAILED DESCRIPTION

The present invention is applicable to a variety of programmable hardware circuits. An appreciation of the present invention is presented by way of specific examples utilizing programmable integrated circuits (ICs) such as field programmable gate arrays (FPGAs). However, the present invention is not limited by these examples, and can be applied to any appropriate hardware device that includes programmable resources capable of implementing the described functions.

The various embodiments of the invention generate cache coherence logic for distributed caches in a function accelerator, which does not have built-in cache coherence logic. Through compilation of the high-level language (HLL) source code, which determines the functions and caches implemented on the function accelerator, cache coherence logic is generated for the distributed caches on the function accelerator. Involving the compiler in generating the cache coherence logic allows the cache coherence for the distributed caches to be adapted according to the particular application in order to effectively overlap data transfer from caches to memory with processing by the general purpose processor. The overlapping of data transfer and data processing provides improved system processing throughput.

In one embodiment, a compiler translates the HLL source code into an intermediate language in which the instructions correspond to HDL specifications for implementing those instructions as circuits of the system. The compiler also identifies and defines multiple caches for the system, with each of the caches being dedicated to caching data from a particular region of a global address space that is shared with software executing on a processor. For each of the caches that will be written to by a circuit, the compiler inserts a flush instruction in the intermediate language program after the last instruction to write to the cache. The flush instruction directs a cache to write updated values back to main memory (or directly into another cache), maintaining a coherent view of memory throughout the system.

The compiler generates an HDL specification from the instructions in the intermediate language program, with the compiler using placement of the flush instructions in the intermediate language program for generating a hardware description that overlaps flushing of caches with data processing. The HDL specification defines the many caches with respective flush interfaces, along with circuits for processing the data in the caches and circuits requesting access to the caches. Each flush circuit writes data from one of the caches to another memory structure, for example, to the main memory, in response to a flush signal from a circuit for requesting write access to the cache. In one embodiment, the function accelerator and many caches are configured in a programmable logic device (PLD) such as an FPGA, or in another type of programmable integrated circuit.

Figure 6:
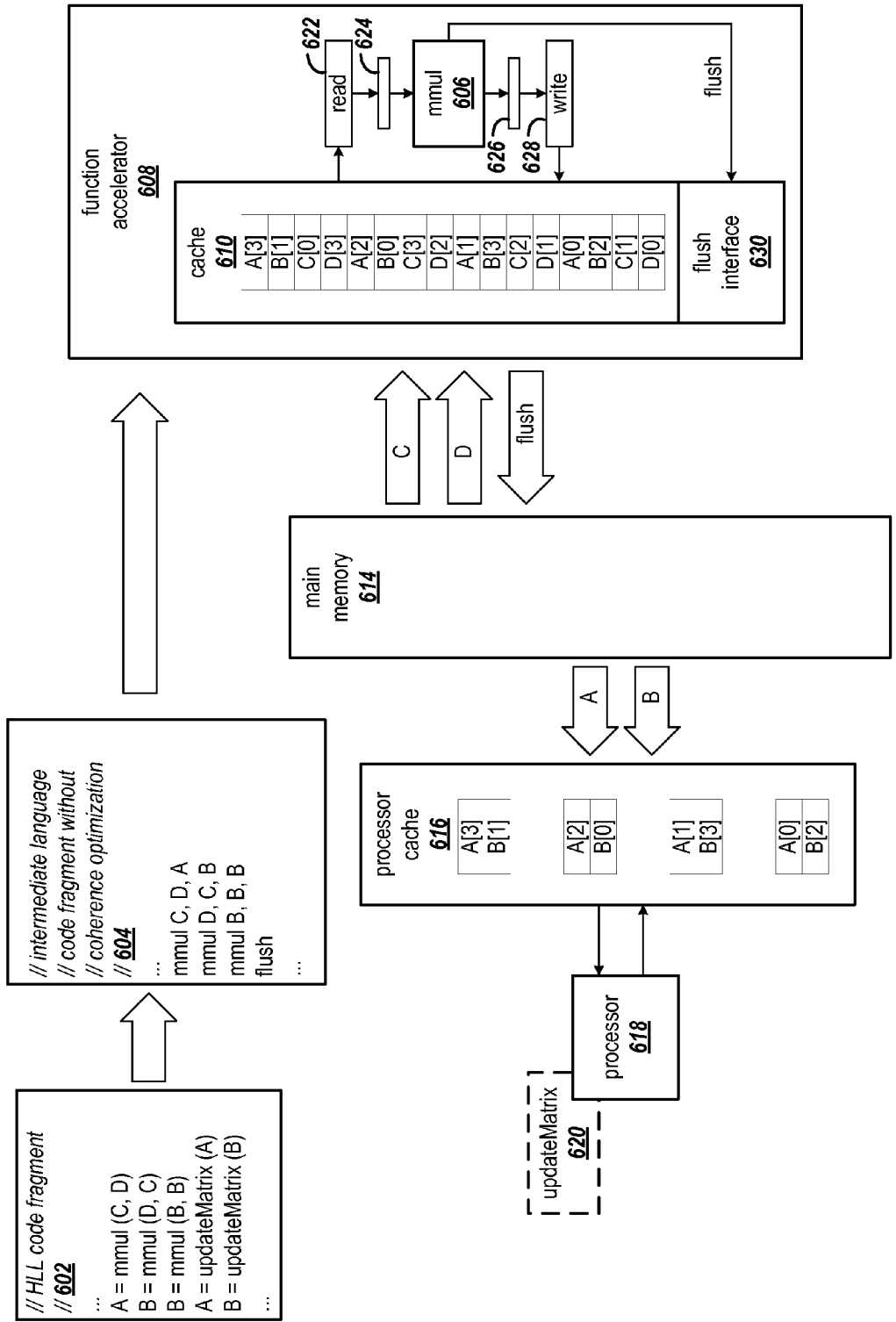
FIG. 6 shows the transformation of an example HLL code fragment into intermediate language code, from which a configuration for a function accelerator is derived.
Figure 7:
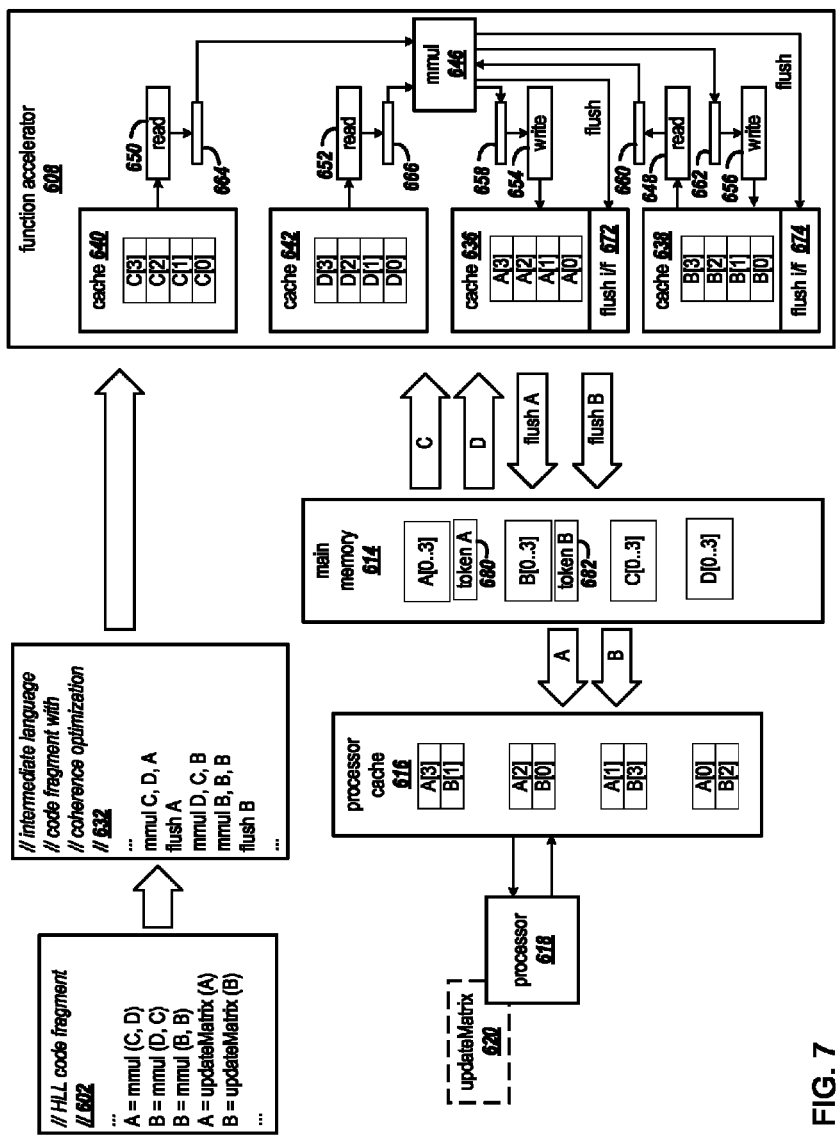
FIG. 7 shows the same example code fragment of FIG. 6 in which cache coherence between a function accelerator cache and a processor cache has been optimized by a compiler.
Figure 8:
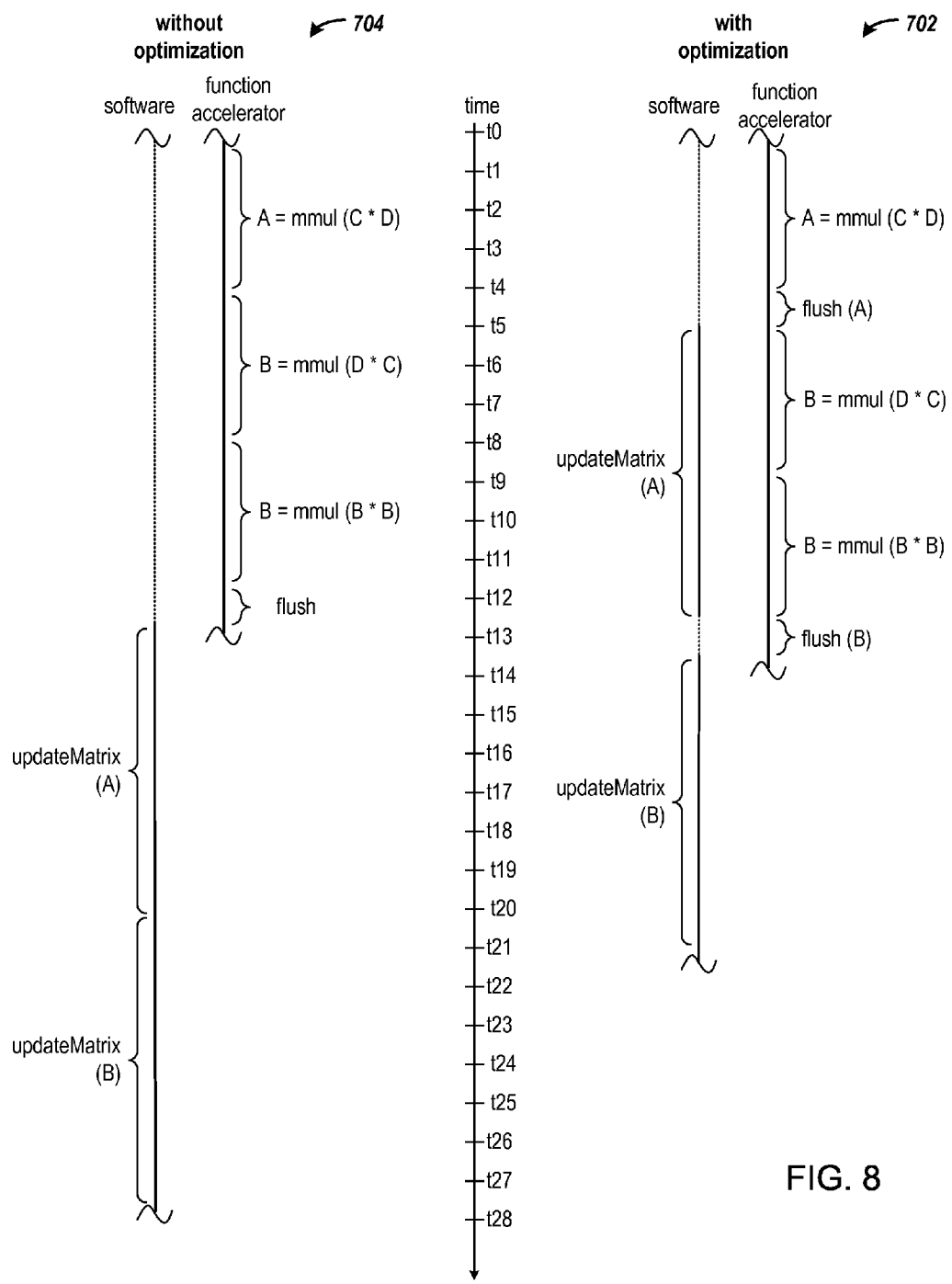
FIG. 8 is a timing diagram that shows the relative times of operations for the non-optimized example of FIG. 6 and the optimized example of FIG. 7.
Figure 9:
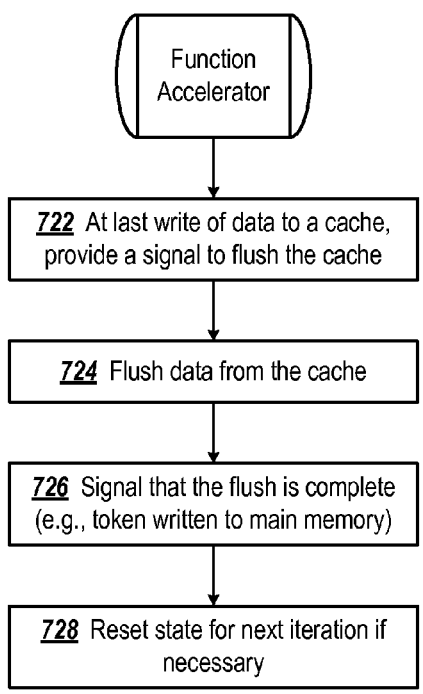
FIG. 9 is a flowchart of an example process performed on the function accelerator in flushing data from a cache in accordance with an embodiment of the invention.
Figure 10:
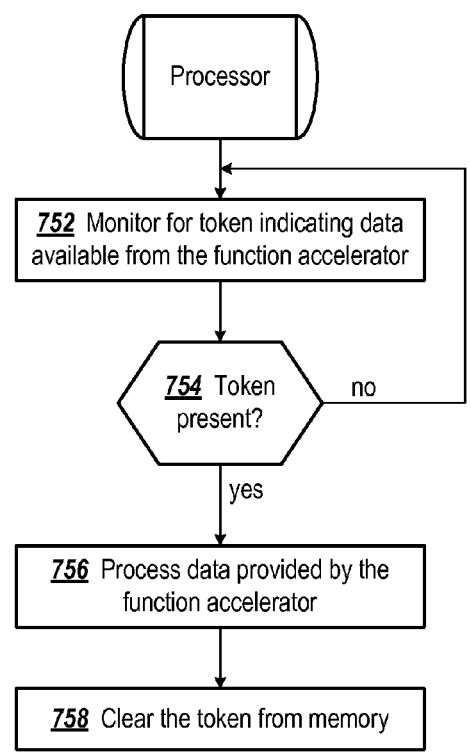
FIG. 10 is a flowchart of an example process performed by software executing on a processor for cooperating with the flushing of a cache from the function accelerator.
Figure 13:
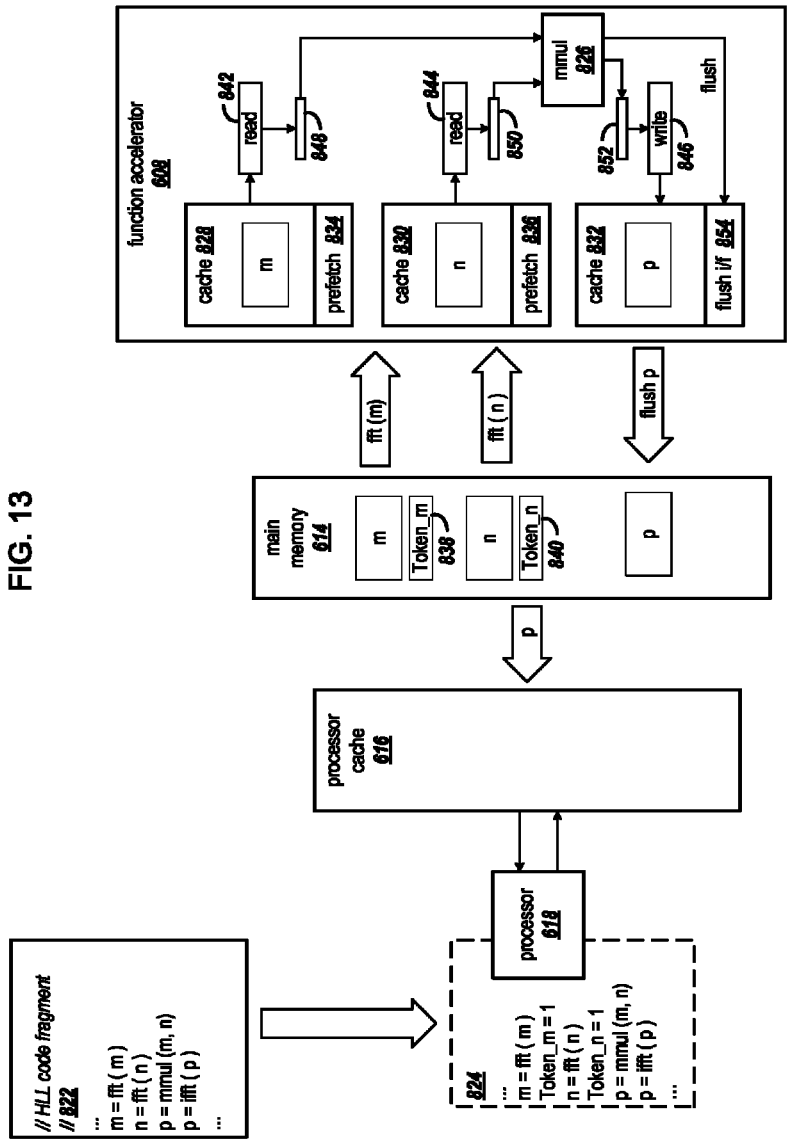
FIG. 13 shows an example HLL code fragment from which cache prefetch logic for a function accelerator is generated.
Figure 14:
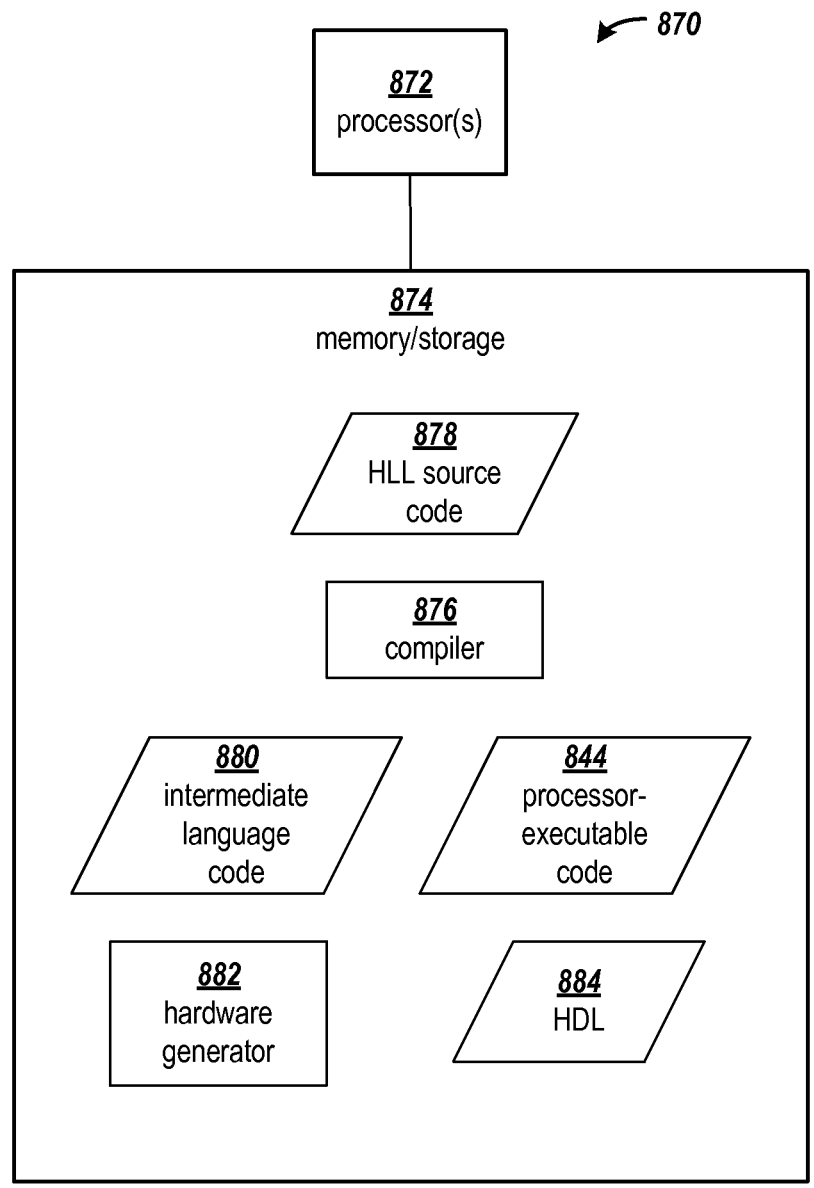
FIG. 14 is a block diagram of an example computing arrangement on which the processes described herein may be implemented.
Figure 15:
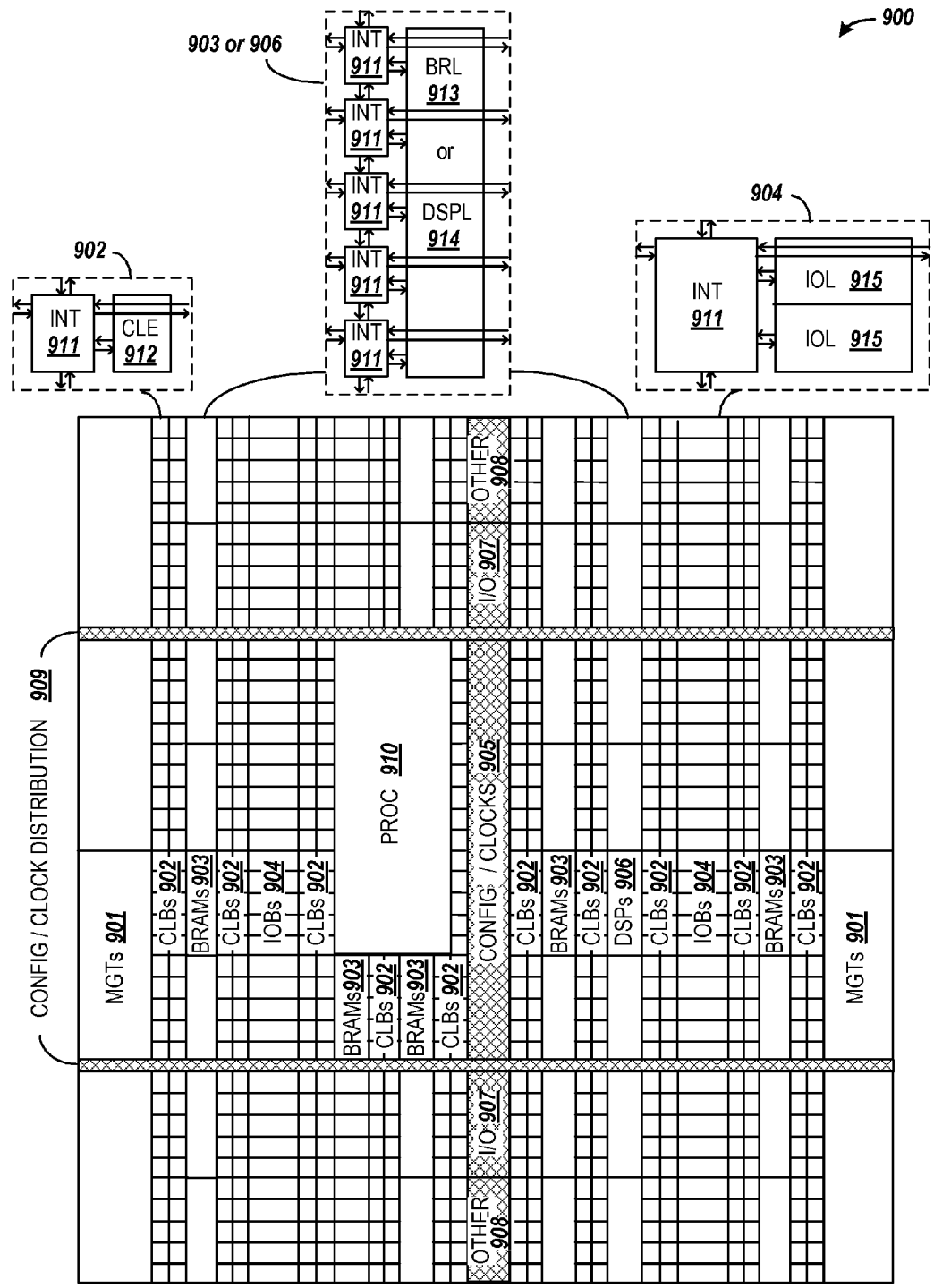
FIG. 15 illustrates an example FPGA architecture on which a system may be implemented using the various approaches described herein.

The figures are generally organized as follows. FIGS. 1-5 and the accompanying description describe generation of the many cache architecture along with optimization of cache coherence of the many caches on the function accelerator. The cache coherence optimization involves compiler-identified flush points for the caches. FIGS. 6-8 illustrate the benefits achieved in compiler-directed cache coherence optimization for a particular example HLL code fragment by comparing a cache coherence mechanism without optimization to a coherence mechanism with optimization. FIGS. 9-10 illustrate cache coherence processing by a function accelerator and a processor operating in accordance with embodiments of the invention. FIGS. 11-13 illustrate another embodiment of the invention involving compiler-identified prefetch points for the caches. FIGS. 14 and 15 show an example processor-based system and an FPGA, respectively. The figures will be described in more detail below.

Figure 1:
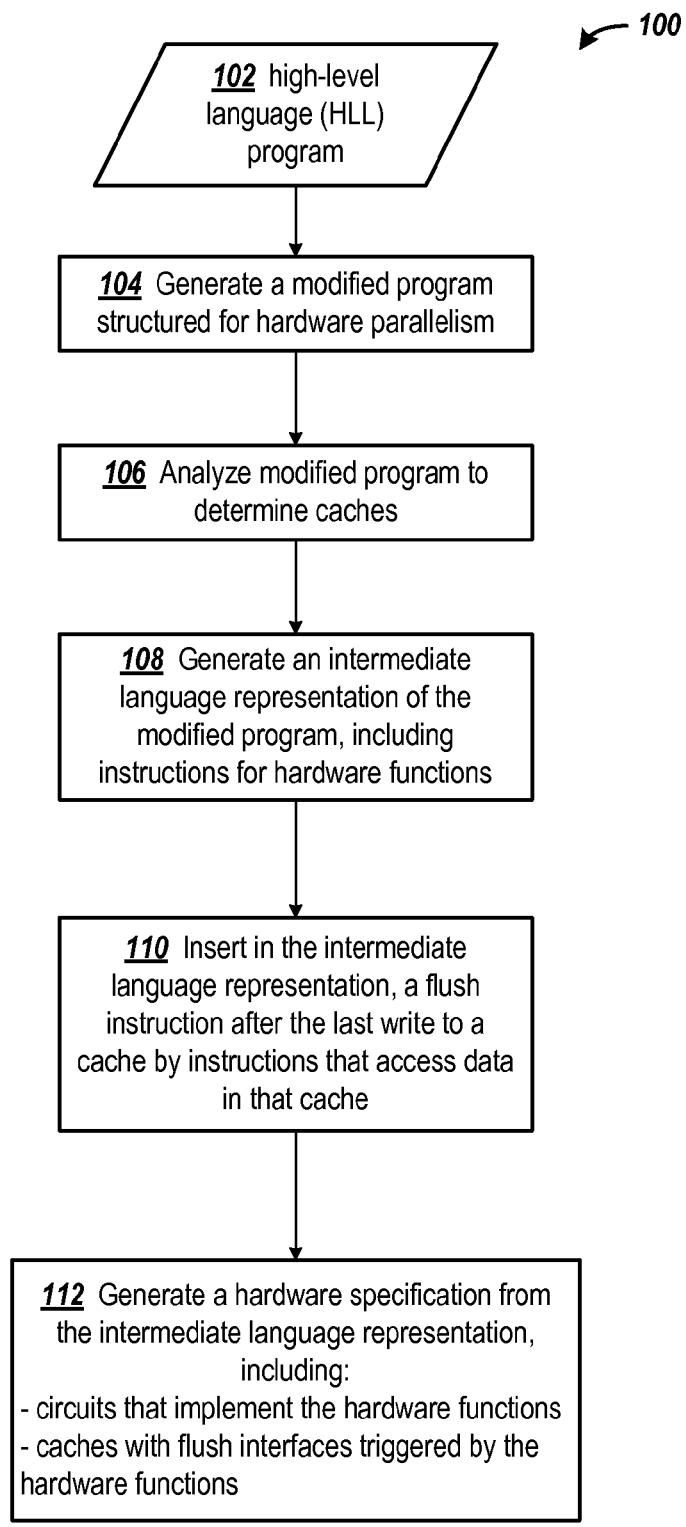
FIG. 1 is a flowchart of an example process for generating a hardware specification from an HLL program.

FIG. 1 is a flowchart of an example process 100 for generating a hardware specification from an HLL program. The resulting hardware specification describes hardware functions derived from the HLL program, along with many caches. The caches are flushed in support of cache coherency and flushed at times that reduce latency and overlap data transfer and data processing, as determined and optimized by compilation of the HLL program.

From an input high-level language program 102, at step 104 a modified program is generated which is structured for hardware parallelism. Such parallelism may include, for example, the unrolling of loops in the program code. With a loop having been unrolled some number of times, that number of parallel hardware paths may be generated.

At step 106, the process analyzes the modified program to determine the appropriate caches along with suitable times for flushing those caches. For example, in an example HLL program the compilation process may determine that respective caches are desirable for matrices referenced in the program where an operation, such as matrix multiplication, is to be performed on those matrices and the matrix multiplication is to be implemented and performed on a function accelerator. The example HLL program specifies further processing of the matrices resulting from the matrix multiplication on a processor. Thus, the contents of the resulting matrices must be flushed from the respective caches on the function accelerator to memory that can be accessed by the software executing on the processor. The embodiments of the present invention determine from the HLL program, times at which the caches can be flushed in order to reduce communication latency and overlap the communication with computation. The compilation process determines the time for flushing a cache based on the last instruction to write to that cache in the HLL program. An example is shown and described in association with FIGS. 6-8.

At step 108, an intermediate language program is generated from the modified program. The intermediate language program includes instructions for the hardware functions, along with cache access instructions for reading data from and writing data to the caches. At step 110, flush instructions are inserted in the intermediate language representation. As determined at step 106, each flush instruction is inserted after the last write to a cache in a sequence of instructions. The hardware, which is eventually implemented from the intermediate language representation, flushes the cache immediately after the last write to the cache rather than at some later time. This reduces the time that some other computational unit, such as a processor, has to wait for data and further supports overlapping of cache coherence communications with processing on the function accelerator or general purpose processor.

A hardware specification is generated from the intermediate language program at step 112. The approaches described in the Bennett patent may be used to generate the hardware description for the hardware functions, and the description below may be used in generating the hardware description of the caches. In an example embodiment, the hardware specification is in a hardware description language (HDL). The generated hardware description specifies the circuits for implementing the hardware functions, along with the caches with flush interfaces and optimized flushing. The hardware description may be further processed, for example, synthesized, mapped, placed-and-routed, etc. for generating a circuit implementation.

The description of FIGS. 2-5 is provided for purposes illustrating an approach for generating a system specification which includes a function accelerator and distributed caches. For further discussion of optimizing cache coherence logic for distributed caches on a function accelerator, reference is made to the description of FIGS. 6-15.

Figure 2:
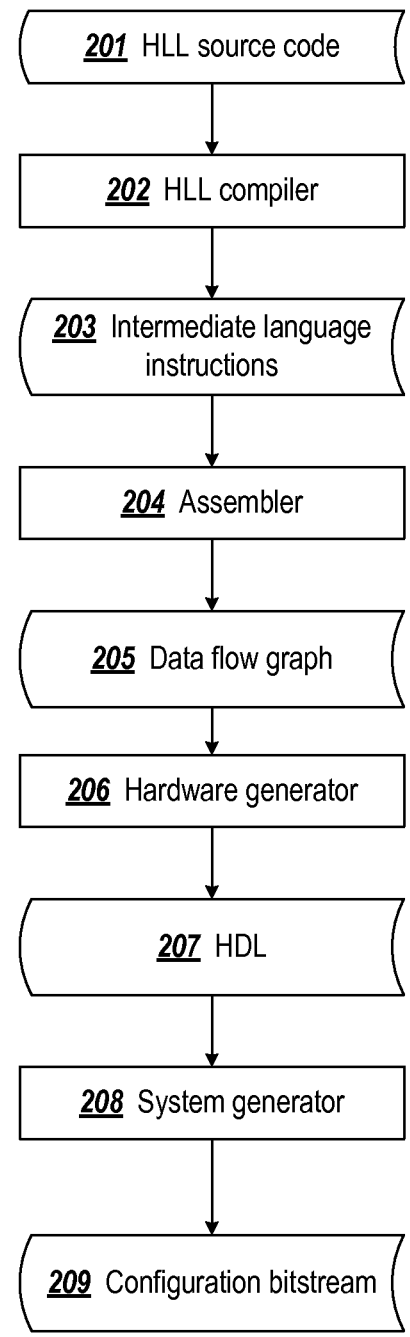
FIG. 2 is a block/flow diagram depicting an example embodiment of a compilation flow.

FIG. 2 is a block/flow diagram depicting an example embodiment of a compilation flow 200. Compilation flow 200 starts with source code written in an HLL at 201. At 202, the HLL source code is compiled by an HLL compiler. The HLL compiler is not directed at a data streaming model, as described below herein in additional detail, but is directed at a spatial compilation. By spatial compilation, it is generally meant generation of application directed systems where data and control are stored near their uses for transmission over small distances. Thus, HLL source code, which may have previously been written for a general purpose microprocessor memory model or a spatial association of compute elements, may be used.

For a spatial compilation, compute elements are unrolled for the hardware, where such compute elements operate on data present on their inputs. This increases parallel or concurrent operation, such as may be implemented in a pipelined architecture. In such a pipelined architecture, computational elements may operate at lower frequencies though with multiple computations executed in parallel on data sets within a same clock cycle. Additionally, data dependency status for data involved in compute element operations is determined to identify compute operations having no data dependency. Thus, data associated with such a compute operation having no data dependency may be stored in a local cache with respect to a compute element or compute elements performing the compute operation. The ability to locally cache data allows such data locality to be exploited. By facilitating multiple instructions being executed in parallel with data locality, memory bottlenecks, namely where memory throughput is lower than data consumption rate of an accelerator circuit, may be avoided. By locally cacheable data, it is not meant all data. For example, in the computer language C, locally cacheable data types include array data types, pointer data types, structure data types, and global data types. While the embodiments described herein are not limited to these data types in C, it should be understood that not all data is locally cacheable data as described herein. Thus, conventionally temporary scalar data stored in a register file in a microprocessor is not locally cacheable data. Moreover, data which is stored in "main memory" is typically locally cacheable data.

It shall be appreciated that memory accesses are random memory accesses in contrast to data streaming accesses. However, instructions compiled by an HLL compiler may be those of a traditional microprocessor Instruction Set Architecture ("ISA") for microprocessor chip set. In addition to such instructions, performance may be enhanced by additional tailoring due to the availability of programmable logic not available with a general purpose microprocessor.

Caches facilitate exploitation of data locality. FPGAs, which conventionally have BRAMs or may be configured with look-up table random access memories ("LUTRAMs"), may be used as described below in additional detail to implement a distributed cache. The distributed cache may be used to provide data locality with respect to computational circuits of an application or design. Heretofore, distributed caching was not advocated for implementation in an FPGA, as it undermined the more performance driven data streaming model. However, ease of use may be facilitated by a distributed cache, as the more well-known software programming model for writing source code for microprocessors may be used.

In a conventional software application, memory accesses actually are not random but may be correlated. Thus, locality of memory accesses, spatial locality, and temporal locality, may be associated with such correlation. Spatial locality conventionally means that data for an operation is accessed and there is likelihood that neighboring data will also be accessed for the same operation. Temporal locality conventionally means that data which has recently been accessed is likely to be accessed again within the near future. A distributed cache may take advantage of spatial locality by having sets of data immediately available to a compute operation for which they are used, and by caching such data, temporal locality may be facilitated. Caches as used in microprocessor architectures are well known. It should be appreciated that such caches are fixed general purpose caches which are not tailored to a specific application to be executed on the general purpose microprocessor.

Patterns of memory accesses may be unchanged by an implementation of an accelerator in an FPGA as described herein even though the same software which may have previously been used for execution in a microprocessor memory model, is executed in an FPGA instantiation of the application. However, by having a distributed cache, data locality may be enhanced along with overall system performance. In fact, multiple memory accesses may be supported in parallel, unlike a conventional microprocessor system. Furthermore, unlike a conventional multi-microprocessor system with shared memory, multiple memory accesses may be facilitated with less arbitration.

As described herein in additional detail, an HLL compiler is configured to create multiple caches which may be specific to an application being compiled. These multiple caches may support multiple memory accesses, which may be concurrent. Furthermore, such caches may be parameterized to be more tailored to the application being compiled.

An HLL compiler that may be adapted for providing a distributed cache is Compiling High Level Language to Massively Pipelined System ("CHiMPS"). An intermediate language file is the output language of an HLL compiler. Compilation flow 200 is for CHiMPS that has been adapted to provide a distributed cache. Thus, in flow 200, HLL source code is compiled into the intermediate language and then data flow architecture is generated from the intermediate language. In contrast to non-adapted CHiMPS, the data flow architecture of adapted CHiMPS uses a distributed cache in addition to first-in/first-out buffers ("FIFOs"). Thus, in contrast to what was previously done in a non-adapted CHiMPS, the pipelines having read and write instructions, any number of which may be operated in parallel depending on data dependency constraints in an application, are partitioned into read and write instructions between multiple caches. All or some of these multiple caches may be coherent depending upon the data uses of the application. Thus, reads and writes may be allocated to different caches to facilitate data locality, as well as execution in parallel. Of course, reads and writes associated with a same cache may be serviced in sequence using an arbitration protocol. Additional detail regarding a non-adapted CHiMPS compiler may be found in the Bennett patent.

HLL compiler 202, which in this example is an adapted CHiMPS as described above, compiles HLL source code 201 to provide intermediate language instructions 203. Intermediate language instructions 203 are provided as input to assembler 204. Responsive to intermediate language instructions 203, assembler 204 provides a data flow graph 205. Data flow graph 205 may be input to a hardware generator 206 for generating a hardware description language code (HDL) 207. HDL 207 may be input to a system generator 208 to provide a configuration bitstream 209.

HLL compiler 202 may be configured to assign all memory operations to a single cache, or alternatively allow a programmer to assign different caches by modifying cache identification (ID) values generated by HLL compiler 202. A restrict keyword in the C programming language for example may be used by a programmer to qualify an array such that HLL compiler 202 is informed that such an array or a memory location thereof is non-aliased. HLL compiler 202 may, though need not, be configured to support restrict operations. However, if restrict operations are supported, HLL compiler 202 may generate different cache IDs in the presence of multiple arrays. This may be done by modifying an intermediate language file generated by HLL compiler 202 to identify arrays for separate caches. Alternatively, rather than modifying an intermediate language file, a separate file may be used to identify arrays for separate caches.

Intermediate language instructions 203 facilitate creation of multiple caches as part of compilation flow 200. An example format for a read instruction may be:

read <cacheid>;[<tapid>];[<width>];<address>[<sync-in>];<data>[;sync-out>]

This read instruction is presented as a pseudo-instruction for coupling a FIFO (not shown) for an address register identified in such instruction to a read tap address input. The FIFO for the data register identified in the read instruction is coupled to a tap output register. Responsive to a FIFO receiving a value for an associated address, such value may be automatically directed to a read tap to initiate processing. However, this does not necessarily mean that the data FIFO will be ready when a next instruction calls for data. Thus, it is possible that the consumer of such data will be blocked waiting for a read to finish. The read instruction described above is for a cache for which the word size has not been optimized. A longread instruction may be provided for reading from a cache with an optimized word size for providing parallel access to the cache.

HLL compiler 202 may assign a cache ID value for a read instruction, as well as a tap ID value. The cache ID value identifies to which cache the read is directed. Of note, HLL compiler 202 may be configured to make informed decisions based on input source code, namely to identify which instructions are more likely to access memory, and in particular which instructions are more likely to access the same cache. Alternatively, rather than relying on HLL compiler 202, a programmer may embed such information for HLL compiler 202 to indicate which instructions are more likely to access the same cache.

A tap identifier in a read instruction is a number from 0 to (N−1), where N indicates a number of available taps in a multi-ported memory. There may be a multiple of read ports, a multiple of write ports, or a combination of multiples of read and write ports. A tap identifier indicates which tap for a cache memory is to be used. As used herein, a cache may be assumed to be implemented using random access memory resources of a PLD. A cache controller may read data for a lowest tap number first, such that HLL compiler 202 may assign numbers in reverse order in intermediate language instructions 203.

Sync-in and sync-out in a read instruction facilitate execution of reads and writes within a specified pipeline or thread in a proper order. If there are no data dependencies between reads and writes, a particular read and write may, though need not, occur in the same order in which they are specified in intermediate language instructions 203. This is because order is dependency-based, which allows for operations that are not interdependent, namely operations that do not have data dependencies upon one another, to be executed concurrently. As described herein, separate memories or non-overlapping memory spaces in multi-ported memories are assigned to each read or write, or at least a portion of either the reads or writes, or both, in the intermediate language instructions. Thus, for example, a read instruction having no data dependency and being associated with only locally cacheable data may be assigned a RAM in a programmable logic device, which is not shared. Furthermore, for example, a read instruction having no data dependency and being associated with only locally cacheable data may be assigned a separate memory space in a multi-ported RAM in a programmable logic device, which is shared though the sharing does not preclude concurrent reads therefrom. Assembler 204 may be unable to track external memory dependencies; accordingly, sync registers (not shown) used for sync-in and sync-out may be used for tracking such dependencies with respect to external memory.

Actual values in sync-in and sync-out registers need not actually be used. Rather the presence of data in FIFOs may provide synchronization. Of note, such FIFOs may be "zero-bit-wide" FIFOs if there is hardware to support such a configuration. A read instruction may be paused until data is in a sync-in FIFO before actually executing a read from such FIFO. Once data in a sync-in FIFO is available, data may be entered into a sync-out FIFO, which may be simultaneous with entry of data into a data FIFO.

In an example format of a write instruction, the following fields may be included:

write <cacheid>;<address>;<write value>;<word width>; [;[<sync-in>][;[;sync-out>]]

A write command causes a value to be written into a memory controller at an identified location in memory. The cache ID value identifies to which cache the read is directed. The address field in a write instruction is an operand which identifies a physical address for the start of data to be written into memory. The word width field identifies how many bytes of data are to be written starting at such starting address. The write value field is for an operand. If bit width of the memory is different from the value in the word width field, the write value may be used for padding or truncating the data in order to fit the bit width of the physical memory data interface for such a write. The write instruction described above is for a cache for which the word size has not been optimized. A longwrite instruction may be provided for writing to a cache with an optimized word for parallel writing to the cache.

Sync-in and sync-out registers, which may be implemented as FIFOs (not shown), may be used to synchronize memory accesses. Actual values in such sync-in and sync-out FIFOs need not be used; rather, the presence of data in such FIFOs may be used for synchronization. A write instruction may be paused until there is data in a sync-in FIFO before initiating execution of a write. Once a write command has been executed, at least with respect to one or more local caches, data may be transferred to a sync-out FIFO. Of note, the read instruction and the write instruction may be indicated as a "memread" instruction and a "memwrite" instruction, respectively.

Multiple loop iterations may be executed at the same time and sync-in and sync-out may be used to ensure that the reads and writes within an iteration happen in an intended order. If a cache ID is specified in a read or write instruction, such cache ID identifies to which cache a read or write is to be directed. If a write instruction specifies multiple cache IDs, namely multiple locations to which data is to be written, then those identified caches may be updated with the written memory. Additionally, external memory may be updated for data coherency. If no cache ID is specified, all caches may be notified of a write to external memory for purposes of erasing or deleting associated information in those caches, namely deleting data in one or more lines of those caches. In other words, if no caches are specified, the write may go directly to off-chip memory. Of note, this may be used to force cache lines, which are otherwise flagged for being presently in use, to be written from such caches to external memory before sync-out is issued or otherwise asserted.

Figure 3A:
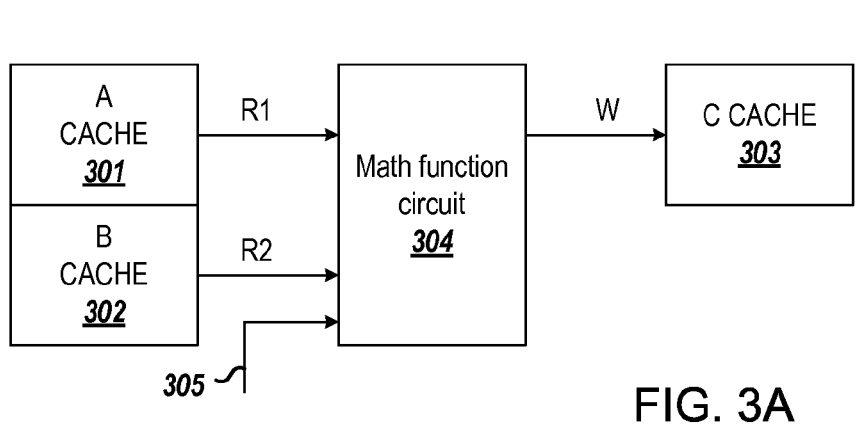
FIG. 3A is a block diagram depicting an example embodiment of a circuit which may be implemented responsive to the output of the HLL compiler of FIG. 2.
Figure 3B:
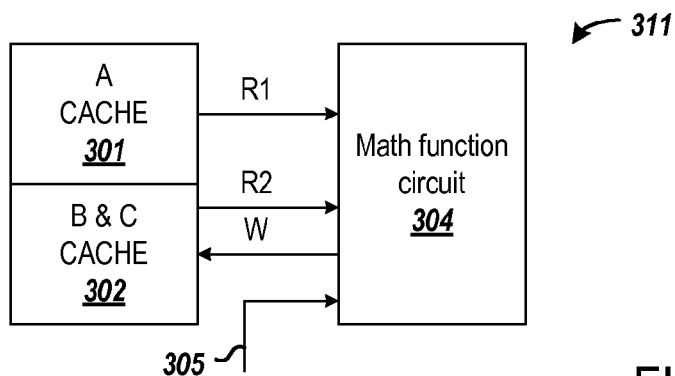
FIG. 3B is a block diagram depicting an example embodiment of a circuit which may be implemented in an FPGA or other programmable device, responsive to the output from the HLL compiler.
Figure 3C:
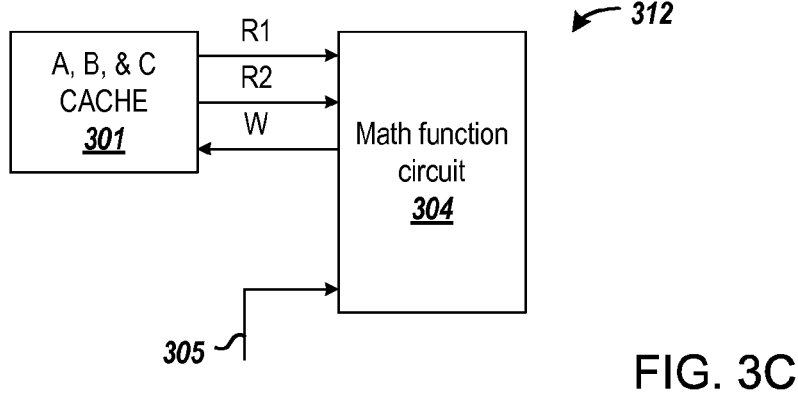
FIG. 3C is a block diagram depicting an example embodiment of a circuit which may be implemented in an FPGA or other programmable device, responsive to the output from the HLL compiler.

FIGS. 3A-C show different cache implementations for three regions memory (A, B, and C) which are accessed by a math function circuit. FIG. 3A is a block diagram depicting an example embodiment of a circuit 310 which may be implemented responsive to output of HLL compiler 202 of FIG. 2. Compiler 202 may identify read instructions R1 and R2 and a write W instruction in a line of source code. HLL compiler 202 may thus assign cache 301 and cache 302 for storage of data A associated with read instruction R1 and for data B associated with read instruction R2, respectively.

A math function circuit 304, which may be implemented in programmable logic, may receive a command signal 305 for carrying out a mathematical operation on data read responsive to read instructions R1 and R2 having addresses for caches 301 and 302, respectively. Of note, even though BRAMs are used, as such BRAMs are generally available in an FPGA, other forms of random access memory may be used. Furthermore, for an FPGA implementation, LUTRAMs may be used. After performing each operation on data obtained responsive to read instructions R1 and R2, math function circuit 304 may issue a write instruction W for writing result data C from math function circuit 304 to cache 303 starting at an address specified by W.

Of note, it is not necessary that each read instruction and each write instruction be associated with a separate memory, such as caches 301 through 303, for purposes of data locality.

FIG. 3B is a block diagram depicting an example embodiment of a circuit 311 which may be implemented in an FPGA responsive to output from HLL compiler 202. In this circuit, reads R1 and R2 are still assigned to caches 301 and 302, however, write instruction W is assigned to cache 302 for writing result data C thereto.

FIG. 3C is a block diagram depicting an example embodiment of a circuit 312 which may be implemented in an FPGA responsive to output from HLL compiler 202. In FIG. 3C, read instructions R1 and R2, as well as write instruction W, are assigned to cache 301. Of note, for executing reads in this example in parallel, cache 301 may be a multi-ported BRAM. Alternatively, if multi-porting is not available, multiplexing circuitry may be provided on the input or output end, or both, of a memory for providing multi-port capability.

Figure 4:
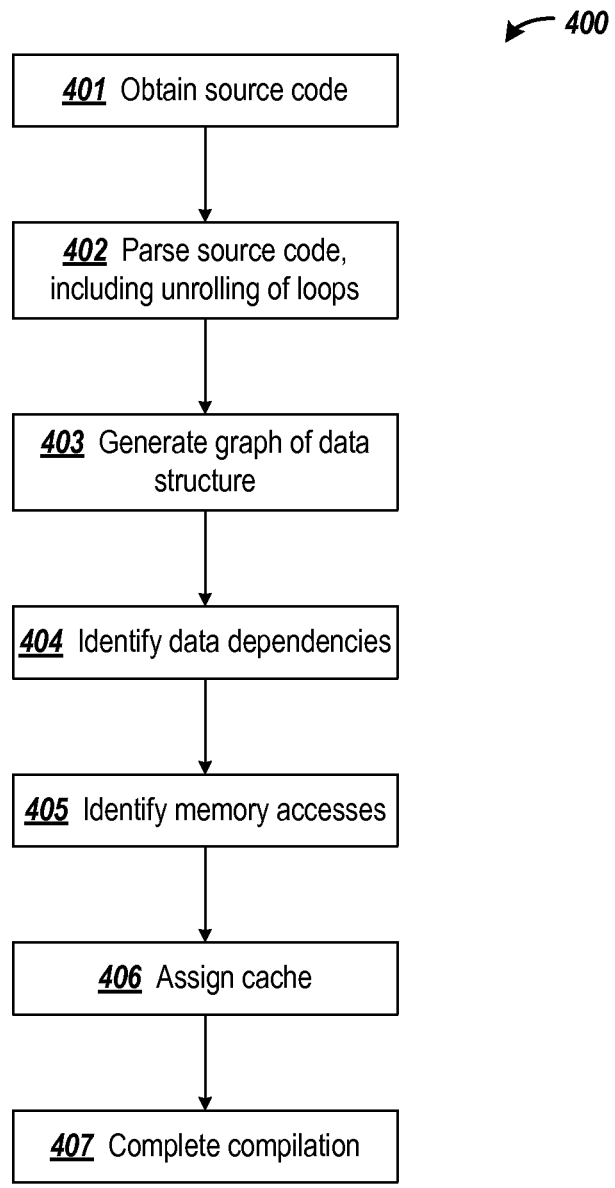
FIG. 4 is a flow diagram depicting an example embodiment of an application-specific partitioning of memory access to multiple caches flow.

FIG. 4 is a flow diagram depicting an example embodiment of an application-specific partitioning of memory access to multiple caches flow 400. Flow 400 may be part of HLL compiler 202, which produces the intermediate language code. At 401 source code for an application is obtained. Source code may include one or more lines of instructions which may after compilation be read or write instructions. It should be understood that source code may not actually call out a read or a write to memory until after such source code is compiled or assembled. At step 402, the source code is parsed and analyzed for optimization opportunities for structuring hardware and structuring the cache. For example, the HLL source code is optimized for hardware parallelism by unrolling selected program loops some number of times. For purposes of optimizing the cache structure, accesses to consecutive non-dependent logical addresses are identified for determining the cache word size. At 403, a data flow graph is generated from source code parsed at 402. At 404, data dependencies are identified from the data flow graph.

At 405, memory accesses in the source code obtained at 401 are identified. These may include one or more memory read accesses, one or more memory write accesses, or a combination thereof. If a read or a write memory access in HLL source code 201 is associated with processing data having dependencies, then at 406 such memory access is not assigned a separate cache or a separate memory space of a multi-ported cache of a distributed cache as described herein. Thus, for example, all such reads and writes with data dependencies may be excluded from being assigned separate cache at 406.

If, however, all the data of a read or a write memory access in HLL source code 201 is independent, namely no data dependency, then at 406 those memory accesses without data dependencies may be assigned to individual caches or may share one or more caches with non-overlapping memory spaces at 406. Of note, the data described as being cacheable in a separate cache or a separate memory space of a multi-ported cache is locally cacheable data. Furthermore, such locally cacheable data without data dependency is assigned a separate/non-shared cache, or assigned a non-overlapping/separate memory space in a shared multi-ported cache for concurrent access. After memory accesses are assigned to caches at 406, at 407 HLL compiler 202 may complete the compilation of HLL source code 201 including assigning memory accesses to multiple caches responsive at least in part to the identified memory accesses having no data dependencies.

For application-specific partitioning of memory accesses to multiple caches for a design or application to be instantiated in an FPGA, cache may be assigned to each read and each write instruction provided there are no data dependencies associated therewith. In other words, for one or more read instructions without data dependencies cache may be allocated, and for each write instruction without data dependencies cache may be allocated. To maximize parallelism, independent memory accesses may be assigned to different caches. Allocation of such caches may be done by HLL compiler 202. Furthermore, allocation of such caches may be done in conjunction with use of HLL compiler 202 under guidance of a software programmer. For example, in embedded C code, a programmer may guide a compiler, such as HLL compiler 202, to allocate separate memory spaces for each array by explicitly specifying such allocations. Moreover, because such explicit specification may be done, a programmer may manually encode in HLL source code, such as HLL source code 201 of FIG. 2, the assignment of caches.

In order to further understand the assignment of caches, an example of vector addition is provided for purposes of clarity. The example of vector addition is provided for vectors A and B being added to provide a vector C for data 0 through 63, where i is incremented by 1, as indicated below:

for (i=0; i<64; i++) C[i]=A[i]+B[i];

In this code, a vector sum of A and B is calculated and the result C is stored. In this example, the reads from A and B originate from the same cache. Furthermore, the write of C is to the same cache from which A and B were previously read, as generally indicated in FIG. 3C.

A refinement would be to allocate three memory access instructions to different caches as arrays associated with vectors A and B, and resulting vector C are independent. Of note, it is assumed that the memory regions where vectors A, B, and C are stored are independent (i.e. that a write to one vector does not change the contents of another vector) By assigning three separate caches, such as generally indicated in FIG. 3A, conflict between the three arrays associated with vectors A and B and vector sum C may be eliminated in comparison to obtaining all data for example one from a single cache and storing a result in such cache. By assigning three separate cache memories for data for vectors A, B, and C, respectively, parallelism of cache access is enhanced.

The following example is the same as the above example except it indicates the assignment of three separate cache memories as opposed to a same cache memory as in the prior example:

for (i=0; i<64; i++) {
  C[i]=A[i]+B[i];
}

An intermediate language instruction set for the above example for assigning separate memory accesses to independent caches may be as follows:

read 0; 0; 4; A_addr; sync_in; sync_out
read 1; 0; 4; B_addr; sync_in; sync_out
write cache_id; C_addr; C_value; 4;sync_in; sync_out Furthermore, an intermediate language instruction set for assigning memory accesses all to a single cache as in the first example may be as follows:

read 1; 1; 4; A_addr; sync_in; sync_out
read 1; 2; 4; B_addr; sync_in; sync_out
write cache_id; C_addr; C_value; 4; sync_in; sync_out Accordingly, with renewed reference to compilation flow 200 of FIG. 2, it should be appreciated that from HLL source code 201 to configuration bitstream 209, a single cache or multiple caches with complete independence or any combination therebetween, may be used for providing an application-specific partitioning of memory accesses for an application or design to be instantiated in an FPGA or an ASIC.

Of note, it is possible that data is shared between operations. Accordingly, there may be some coherency of data to be addressed as between caches. Such data coherency may be used to preserve, for example, coherency between caches, as well as between caches and main or system memory. For coherency, data may be broadcast to all caches and main memory. It should be understood that broadcasting may be provided as part of a configuration bitstream 209 for purposes of data coherency among caches or among caches and main or system memory, or some combination thereof. However, data coherency will vary from application to application.

Figure 5:
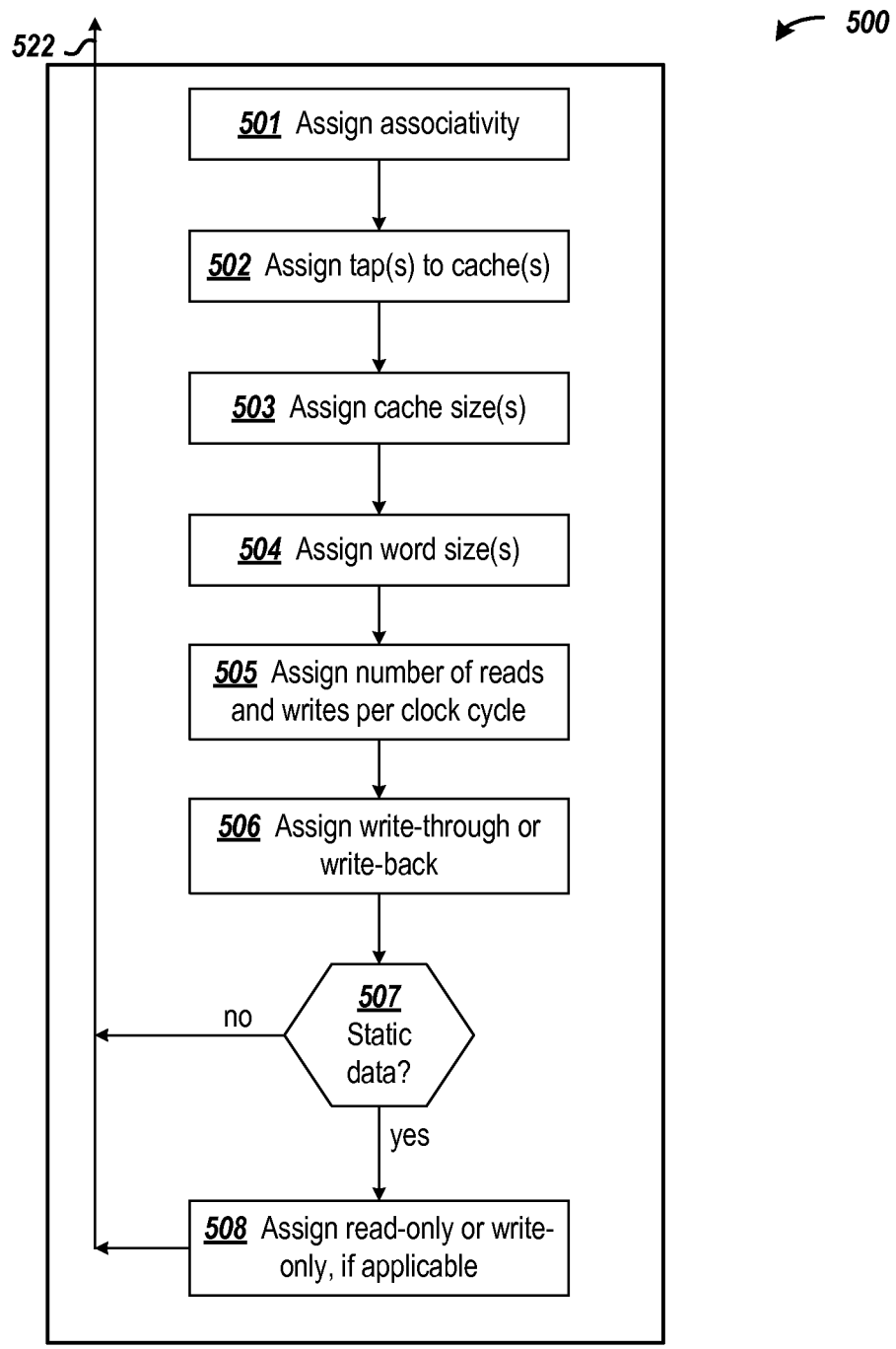
FIG. 5 is a flow diagram depicting an example embodiment of a cache assignment flow.

FIG. 5 is a flow diagram depicting an example embodiment of a cache assignment flow 500. Each of the operations of cache assignment flow 500 are illustratively shown with dashed lines to generally indicate such operations are programmable options for tailoring to an application.

Cache assignment flow 500 may be implemented in whole or in part for assigning caches as described above with reference to step 406 of flow 400 of FIG. 4. Cache assignment flow 500 facilitates a parameterized cache which may be tailored to a specific application, namely an application or design provided via HLL source code 201 that is to be compiled by HLL compiler 202 of FIG. 2. At 501, associativity of a cache or caches may be assigned. Associativity may include direct-mapped caches, two-way associative caches, four-way associative caches, or other associativity. Again, like many other variables, associativity may vary from application to application.

At 502, one or more taps may be assigned to one or more caches. As previously mentioned, cache memory may be multi-ported, and thus read taps and write taps may be assigned. At 503, cache size may be assigned. Of note, the size of a cache may vary depending on the amount of data to be cached. In addition, the cache word size is selected according to accesses specified in the HLL program code. For a cache in which the HLL program code does not show accesses to non-dependent, consecutively addressed data items in the cache, the cache word size is set for storing a single data item. In contrast, for a cache in which the HLL program shows accesses to non-dependent, consecutively addressed data items in the cache, the cache word size is set to store multiple ones of those data items, for example, accesses to A[i] and A[i+1] (with no intervening updates to these locations). With respect to BRAMs in an FPGA, such BRAMs may be concatenated to form larger memory spaces. However, for an ASIC, cache size may be assigned to accommodate specific data needs of an application.

Where the cache word size of a cache is optimized such that one cache word stores multiple data items, instead of the read and write intermediate language instructions described above in association with FIG. 2 for accessing the cache, special cache access instructions of the intermediate language are used. These instructions are named longread and long write. The format of the longread instruction is as follows:

longread <cacheid>;<width_per word>;<number of items>;<address>; [<sync-in>];<data>;[<sync-out>]

The <cacheid>, <address>, [<sync-in>], <data>, and [<sync-out>] fields are as described above for the read instruction. The <width_per word> field specifies the number of bytes in a cache word in an example embodiment, and the <number of items> field specifies the number of data items in a word of the cache.

The format of the longwrite instruction is as follows:
longwrite[<cacheid>];<width_per word>;<number of items>;<address>;[<sync-in>];<data>[;syncout>]

The <cacheid>, <address>, [<sync-in>], <data>, and [<sync-out>] fields are as described above for the write instruction. The <width_per word> field specifies the number of bytes in a cache word in an example embodiment, and the <number of items> field specifies the number of data items in a word of the cache.

At 504, one or more cache line sizes may be assigned. Cache line sizes may vary according to the number of words read out or written in during a burst. Furthermore, this will vary depending on the size, namely number of bits, of a word. Conventionally, burst length is set equal to line length. With respect to BRAMs in an FPGA, such BRAMs may be concatenated to form longer lines.

At 505, the number of reads or writes, or both, per clock cycle may be assigned. It should be appreciated that data may be segmented such that multiple reads or multiple writes, or both, occur in a single clock.

At 506, whether cache memory is to be used in a write-through or write-back mode may be set. At 507, it may be determined whether data associated with such cache is static data. An example of static data includes a fixed set of data completely contained within cache. Another example of static data includes a fixed set of data from which portions are moved from memory into and out of cache. In the latter example, data in cache may be changing; however, the set of data available to such cache for an application is static. If data is not static, then no assignment of any read only status is made, and cache assignment flow 500 is exited.

If, however, data is static, for operation of a design instantiated, then at 508 caches may be set to be read-only cache or write-only cache, as applicable. Continuing the above example, if the array of data associated with vector B is static, HLL compiler 202 may be used to instantiate a read-only cache for storing data associated with vector B. Accordingly, all logic and circuitry associated with supporting writes to such a cache may be removed. Likewise, if a cache is to be used as a write-only cache, circuitry associated with supporting reads from such cache may be removed.

Thus, output 522 of cache assignment flow 500 may include any of a variety of parameters associated with operations 501 through 506 and 508. Of note, not all operations 501 through 506 and 508 need be used. Furthermore, none of operations 501 through 506 and 508 need be used, as default values may be used. However, to provide a parameterized cache which more closely follows a specific application being compiled, cache assignment flow 500 may be used.

Thus, it should be appreciated that the above-described memory model of a distributed cache may be used to exploit data locality. Furthermore, the number of caches generated for such a distributed cache is not necessarily limited by the application, but rather may be limited by the number of embedded memories available with respect to implementation in an FPGA, and need not necessarily be limited with respect to an ASIC implementation.

FIGS. 6 and 7 show two approaches for generating a cache structure for an example HLL code fragment. In the approach shown in FIG. 6, the cache structure and related coherence mechanism (the flush interface) is not optimized, and in the approach shown in FIG. 7 the cache structure and related coherence mechanism is optimized. The target hardware arrangement in both of FIGS. 6 and 7 includes a function accelerator for implementing selected functions from the HLL code, one or more caches with a flush interface to maintain coherence, a processor for executing software compiled from selected code from the HLL code, a main memory arrangement, and a processor cache.

FIG. 6 shows the transformation of an example HLL code fragment 602 into intermediate language code 604, from which a configuration for function accelerator 608 is derived. The coherence between cache 610 in the function accelerator, main memory 614, and processor cache 616 has not been optimized by a compiler.

The HLL code fragment 602 includes three calls to a matrix multiply function, mmul( ), and two calls to the function, updateMatrix( ). The mmul( ) function is to be implemented on the function accelerator 608, and the updateMatrix( ) is to be implemented as software for executing on processor 618. Generally understood techniques may be used to select and delineate between HLL code to be compiled into hardware and code to be compiled into software.

The mmul( ) function calls in HLL fragment 602 are compiled into intermediate language code 604, and the updateMatrix( ) function calls are compiled into updateMatrix software 620 for execution on processor 618. The example intermediate language code 604 includes a flush instruction added after the last mmul instruction. It will be appreciated that the example intermediate language code 604 is abbreviated from the full intermediate language code that would be generated as described in the Bennett patent. The intermediate language code is abbreviated in order to simplify explanation of the relevant instructions. For example, the intermediate language code would include read and write instructions for reading data from and writing data to the cache established on the function accelerator.

From the intermediate language code 604, a configuration is generated for function accelerator 608. For example, if the function accelerator is an FPGA, the intermediate language code is translated into an HDL, which is provided to a design flow, which includes the further tasks of synthesis, mapping, placing and routing, and generating a configuration bitstream. A configuration is generated for logic 606 to implement the mmul function and for a single cache 610, which is not optimized for cache coherence. In order to avoid obscuring the relevant structure, control for sequencing the mmul logic 606 and interface logic between the cache 610 and memory 614 are not shown.

Though not shown, the mmul logic 606 may be implemented with a parallel pipeline structure, with the pipelines performing parallel multiplications of values from the matrices. The mmul logic 606 also includes loop control logic (not shown) for controlling iterations through the matrices. Though unnecessary for understanding the present invention, it may be assumed that software executing on the processor 618 signals the mmul logic 606 when to commence the matrix multiplication, for example, by writing a value to a location in main memory 614 which is monitored by the function accelerator.

Logic on the function accelerator reads matrices C and D from main memory 614 into cache 610 when software on the processor signals to commence processing. Read logic 622 reads matrix values from the cache 610 and provides those values to the mmul logic 606 via first-in-first-out (FIFO) buffer 624. The mmul logic 606 outputs products to the FIFO buffer 626, and write logic 628 writes those values to the cache 610. According to the example non-optimized intermediate language code 604, the resulting matrices are flushed from cache 610 to the main memory 614 once all the matrix multiplications are complete. That is, after the matrix multiplication is complete for matrix B, the contents of cache 610 are flushed.

The mmul logic 606 provides a flush signal to the flush interface 630 to trigger flushing of cache 610 once the matrix multiplication is complete for matrix B. The flush interface 630 reads the contents of cache 610 and writes the data to the main memory via a memory bus and memory controller (not shown). The flush interface may also write a value to the main memory to signal to software that the cache has been flushed.

The updateMatrix function, which executes on the processor, waits for the flush to complete before performing updateMatrix(A) in order to ensure that the data in main memory 614 is up to date with data from the function accelerator cache 610. Once the flush is complete, the updateMatrix software 620 reads matrix A for processing, which results in matrix A being stored in processor cache 616. Matrix B is similarly stored in cache 616 for processing by the updateMatrix software. While not shown, it will be appreciated that the updated matrices A and B in cache 616 would eventually be written back to main memory 614.

From the processing flow in FIG. 6 it may be observed that the updateMatrix software 620 is delayed until the function accelerator has completed processing and flushed both of matrices A and B. This delay is unnecessary since performing updateMatrix on matrix A does not depend on the function accelerator completing matrix multiplication on matrix B. Thus, performing updateMatrix on matrix A could proceed before the function accelerator has completed the matrix multiplication of matrix B if that data were made available sooner in the main memory 614.

FIG. 7 shows the same example code fragment 602 of FIG. 6 in which cache coherence between a function accelerator cache and a processor cache has been optimized by a compiler. In order to maximize parallelism on the function accelerator, separate caches 636, 638, 640, and 642 are established for the matrices A, B, C, and D, respectively. In addition, the separate caches allow cache 636 with matrix A to be flushed to main memory 614 for further processing by the updateMatrix software 620 before the function accelerator has completed processing of matrix B.

The HLL code fragment 602 is compiled into intermediate language code 644 with the flush A instruction inserted after the mmul C, D, A instruction and a flush B instruction inserted after the mmul B, B, B instruction. Inserting the flush A instruction results in hardware that initiates flushing of cache 636 having matrix A before the hardware has multiplied matrices D and C, (mmul D, C, B) and before the hardware has multiplied matrix B (mmul B, B, B). This allows the updateMatrix software 620 to process matrix A without having to wait for the function accelerator to complete the other matrix multiplications.

In other embodiments, the flush instruction need not be inserted at completion of a function. Rather, if the software executing on the processor is suitably programmed to recognize how much data may be processed for a particular data item, such as the first n items in an array, the flush may be triggered before completion of the function.

Along with the caches for matrices A-D, the logic generated from the intermediate language code 644 includes the mmul logic 646, read logic 648, 650, and 652 for reading from caches 638, 640, and 642, respectively, and write logic 654 and 656 for writing to caches 636 and 638, respectively. FIFO buffers 658, 660, 662, 664, and 666 are also generated for pipelining matrix data for the mmul logic and the read and write logic. Flush interface 672 is generated for cache 636, and flush interface 674 is generated for cache 638.

The iteration control logic (not shown) in mmul logic 646 provides a flush signal to flush interface 672 for cache 636 when the matrix multiplication of matrices D and C is complete and store of matrix A into cache 636 complete. The flush interface 672 then initiates flushing of the cache 636 to main memory 614. When the flush is complete, the flush interface signals completion to monitoring software (not shown) executing on the processor 618 by writing token A 680 to main memory. The monitoring software may be a control thread that periodically reads from a designated address for token A, and when a preselected value is present in that location activates another thread to execute the updateMatrix software 620 for processing matrix A. The updateMatrix software reads the contents of matrix A, which results in matrix A being cached in processor cache 616 for processing.

From the processing flow in FIG. 6 it may be observed that the updateMatrix software 620 may commence processing once matrix A has been flushed to main memory, while the function accelerator continues with matrix multiplication of matrices D and C and of matrix B by itself. This overlap of processing with data transfer provides a performance improvement over the example shown in FIG. 6.

FIG. 8 is a timing diagram that shows the relative times of operations for the non-optimized example of FIG. 6 and the optimized example of FIG. 7. The optimized timing 702 shows the updateMatrix (B) function being completed approximately 7 timing units sooner than the updateMatrix (B) function in the non-optimized timing 704.

A relative time scale is shown between the non-optimized timing and the optimized timing. For each example, an execution line is shown for software executing on the processor and an execution line is shown for operations on the function accelerator. The duration of an operation is shown as the length of solid line within a brace labeled with that operation.

From the non-optimized timing 704 it may be observed that the operations are largely sequential with the updateMatrix (A) software function not being performed until all of the matrix multiplications on the function accelerator are complete the cache has been flushed. The updateMatrix (B) software function completes at approximate time t28.

The optimized timing 702 shows that after mmul (C*D) is complete on the function accelerator, the cache with matrix A is flushed (flush (A)). This allows the updateMatrix (A) software function to commence as soon as the flush (A) is complete. In parallel with the updateMatrix (A) software function, the function accelerator continues with the matrix multiplication of D and C and the multiplication of B and B. The cache with matrix B is flushed once the matrix multiplication is complete, and the updateMatrix (B) software function commences once that flush is complete. In the timing 702 for the optimized example, the updateMatrix (B) software function completes at approximately time t21, which is approximately seven units earlier than the non-optimized example.

FIG. 9 is a flowchart of an example process performed on the function accelerator in flushing data from a cache in accordance with an embodiment of the invention.

At step 722, after the last write to a cache for a particular sequence of operations a signal is generated to flush the cache. For the example shown above in FIG. 7, the mmul operation would perform multiple multiplication operations to multiply the combinations of matrix entries. After the last pair of matrix entries has been multiplied and the product written to the cache, the signal to flush the cache is provided.

At step 724, the data from the cache is flushed in response to flush signal. Though the examples described above show flushing from a function accelerator cache to main memory, it will be recognized that in other applications data may be flushed from one function accelerator cache to another function accelerator cache.

Once the data has been flushed from the cache, the function accelerator signals that the flush is complete. In the example described above, the flush completion signal may be provided by way of writing a token value to a designated memory location which is monitored by software.

At step 728, state data of the operation on the function accelerator may be reset for the next data set if necessary.

FIG. 10 is a flowchart of an example process performed by software executing on a processor for cooperating with the flushing of a cache from the function accelerator. At step 752 software monitors a designated memory location for a token value to appear. As described above, the function accelerator writes the token value to the memory once a flush is complete. If the token value is not present, decision step 754 returns the process to step 752 to continue monitoring. Once the token value is present, the process proceeds to step 756 where the data flushed from the cache and now in main memory is processed. Once processing is complete, the software as consumer of the data clears the token from memory at step 758.

In addition to optimizing cache coherence by way of a compiler inserting flush instructions in program code, the cache performance may also be optimized by determining at what point in a software process the function accelerator may be signaled to prefetch data from main memory to a cache in the function accelerator. Prefetching may be used where software calls a function implemented on the function accelerator and that function call specifies data to be input to the function. Rather than waiting until a call is made to the function to transfer the input data to the function accelerator, the prefetch logic begins the transfer at some time during program execution before the call is made to the function. This allows the data transfer to occur while the program is executing and reduces the time the function must wait for data to arrive in the function accelerator cache before the function can commence processing.

FIG. 11 is a flowchart of an example process for optimizing cache performance by way of software executing on the processor signaling to a cache on the function accelerator that data may be prefetched from main memory to the cache on the function accelerator.

At step 782, the compiler finds a call to a function that will be implemented on a function accelerator. Those functions to be implemented on a function accelerator may be designated according to a naming convention or other designation, for example. For each variable passed as input to the function accelerator, at step 784 the process finds the last write in the HLL code to that variable. Immediately after the last write to that variable, the function accelerator can prefetch the variable.

At step 786, the processor executable code, which is generated from the HLL program, is modified to include instructions for signaling the prefetch. In the example embodiment, after the last write to a variable before the call to the function on the function accelerator, a token value is written to a designated memory location which is monitored by the function accelerator.

For each cache having a variable that can be prefetched, the intermediate language code is modified to include instructions that specify prefetch logic for that cache at step 788.

Generally, each prefetch logic block monitors the designated memory location for the presence of the token value described in step 786. When the token value appears the prefetch logic copies the data from the main memory to a cache on the function accelerator.

At step 790, a hardware specification is generated from the intermediate language code. The hardware specification includes caches as described above, logic for implementing a function on the function accelerator (e.g., mmul), and prefetch logic. The hardware description may be further processed for generating a circuit implementation as described above.

FIG. 12 is a flowchart of an example process performed by prefetch logic for a cache on the function accelerator. At step 802, the process monitors main memory for a token value that indicates that data may be prefetched. If the token value is not present (decision step 804), the prefetch logic continues monitoring. Otherwise, at step 806 the prefetch logic reads data from the main memory into the cache on the function accelerator. Once the data has been read from main memory, the prefetch logic clears the token value from main memory at step 808.

FIG. 13 shows an example HLL code fragment 822 from which cache prefetch logic for a function accelerator is generated. The example HLL code fragment 822 specifies fft( ) and ifft( ) functions which are to be performed by software 824 executing on the processor 618. The mmul( ) function is to be performed by the mmul logic 826 on the function accelerator 608. Caches 828, 830, and 832 are generated for matrices m, n, and p, respectively In accordance with one embodiment, the compiler-generated executable code 824 includes instructions for signaling to prefetch logic on the function accelerator when data is available for prefetching from main memory 614. Prefetch logic 834 is generated for cache 828, and prefetch logic 836 is generated for cache 830. The executable code generated by the compiler includes instructions for writing token values to designated locations in main memory 614, and the prefetch logic 834 and 836 monitor those memory locations for the tokens.

In the example executable code 824, the software signals to prefetch logic 834 that matrix m can be prefetched from main memory by storing the value 1 in the memory location for Token_m (838). The store instruction (shown as Token_m=1) is inserted in the executable code 824 immediately after the last write to matrix m (after the function call fft(m)). Thus, the transfer of matrix m from main memory 616 to cache 828 is initiated well before the call to mmul (m,n), which allows the transfer to proceed in parallel with execution of the instructions leading up to the call to mmul (m,n). The executable code similarly includes an instruction for storing to Token_n (840) for signaling prefetch logic 836 to transfer matrix n from main memory to cache 830.

The read logic 842 and 844, write logic 846, FIFO buffers 848, 850, and 852, and flush logic 854 are similar to the corresponding elements described above in the example of FIG. 7.

FIG. 14 is a block diagram of an example computing arrangement 870 on which the processes described herein may be implemented. Those skilled in the art will appreciate that various alternative computing arrangements, including one or more processors and a memory arrangement configured with program code, would be suitable for hosting the processes and data structures and implementing the algorithms of the different embodiments of the present invention. In addition, program code that implements the processes may be provided via a variety of computer-readable storage media or delivery channels such as magnetic or optical disks or tapes, electronic storage devices, or as application services over a network.

Computing arrangement 870 includes one or more processors 872 coupled to a memory/storage arrangement 874. The architecture of the computing arrangement depends on implementation requirements as would be recognized by those skilled in the art. The processor 872 may be one or more general purpose processors, or a combination of one or more general purpose processors and suitable co-processors, or one or more specialized processors (e.g., RISC, pipelined, etc.).

The memory/storage arrangement 874 is representative of hierarchical storage commonly found in computing arrangements. Such hierarchical storage typically includes multiple levels of cache memory, a main memory, and local and/or remote persistent storage such as provided by magnetic disks (not shown). The memory/storage arrangement may include one or both of local and remote memory/storage, remote storage being coupled to the processor arrangement via a local area network, for example.

The processor arrangement 872 executes the software stored in memory/storage arrangement 874, and reads data from and stores data to the memory/storage arrangement according to the processes described above. An operating system (not shown) manages the resources of the computing arrangement.

The processes described herein are implemented in one or more software modules for executing on the processor arrangement 872. For example, a compiler 876 processes the HLL source code 878 and generates intermediate language code 880. A hardware generator 882 processes the intermediate language code 880 and produces a hardware description language (HDL) file 884 that specifies a hardware implementation of one or more functions from the HLL source code. Additional software modules (not shown) may be used in further processing the HDL file into a description that is suitable for a specific hardware implementation. The compiler 876 also generates processor-executable code 844 from the HLL source code 878.

FIG. 15 illustrates an example FPGA architecture 900 on which a system may be implemented using the various approaches described herein. Those skilled in the art will appreciate that the FPGA of FIG. 15 provides only one example of an integrated circuit device on which the methods of the present invention can be practiced. FPGA 900 includes a large number of different programmable tiles including multi-gigabit transceivers (MGTs 901), configurable logic blocks (CLBs 902), random access memory blocks (BRAMs 903), input/output blocks (IOBs 904), configuration and clocking logic (CONFIG/CLOCKS 905), digital signal processing blocks (DSPs 906), specialized input/output blocks (I/O 907) (e.g., configuration ports and clock ports), and other programmable logic 908 such as digital clock managers, analog-to-digital converters, system monitoring logic, and so forth. Some FPGAs also include a hardwired processor 910.

In some FPGAs, each programmable tile includes a programmable interconnect element (INT 911) having standardized connections to and from a corresponding interconnect element in each adjacent tile. Therefore, the programmable interconnect elements taken together implement the programmable interconnect resources for the illustrated FPGA. The programmable interconnect element (INT 911) also includes the connections to and from the programmable logic primitive within the same tile, as shown by the examples included at the top of FIG. 15.

For example, a CLB 902 can include a configurable logic primitive (CLE 912) that can be programmed to implement user logic plus a single programmable interconnect element (INT 911). A BRAM 903 can include a BRAM logic primitive (BRL 913) in addition to one or more programmable interconnect elements. Typically, the number of interconnect elements included in a tile depends on the height of the tile. In the pictured embodiment, a BRAM tile has the same height as four CLBs, but other numbers (e.g., five) can also be used. A DSP tile 906 can include a DSP logic primitive (DSPL 914) in addition to an appropriate number of programmable interconnect elements. An 10B 904 can include, for example, two instances of an input/output logic primitive (IOL 915) in addition to one instance of the programmable interconnect element (INT 911). As will be clear to those of skill in the art, the actual I/O pads connected, for example, to the I/O logic primitive 915 are manufactured using metal layered above the various illustrated logic blocks, and typically are not confined to the area of the input/output logic primitive 915.

Some FPGAs utilizing the architecture illustrated in FIG. 15 include additional logic blocks that disrupt the regular columnar structure making up a large part of the FPGA. The additional logic blocks can be programmable blocks and/or dedicated logic. For example, the processor block PROC 910 shown in FIG. 15 spans several columns of CLBs and BRAMs.

In the pictured embodiment, a columnar area near the center of the die (shown shaded in FIG. 15) is used for configuration, clock, and other control logic. Horizontal areas 909 extending from this column are used to distribute the clocks and configuration signals across the breadth of the FPGA.

Configuration port 918 may be used to access configuration memory in the FPGA 916 to configure the programmable logic and interconnect resources. In one embodiment, an internal scrubber (not shown) may continuously read and correct configuration memory via an internal configuration access port.

Note that FIG. 15 is intended to illustrate only an example FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 15 are purely examples. For example, in an actual FPGA more than one adjacent column of CLBs is typically included wherever the CLBs appear, to facilitate the efficient implementation of user logic.

While the foregoing describes example embodiments in accordance with one or more aspects of the invention, other and further embodiments in accordance with the one or more aspects of the invention may be devised without departing from the scope thereof, which is determined by the claims that follow and equivalents thereof.

What is claimed is:

1. A method for generating an electronic system specification from high-level language (HLL) source code, comprising:
    compiling by a computing arrangement, at least part of the HLL source code into an intermediate language program equivalent to the part of the HLL source code,
    wherein the compiling includes:
    determining from the HLL source code a plurality of caches for storing data referenced by the HLL source; and
    inserting one or more flush instructions in the intermediate language program, wherein each flush instruction references one of caches and is inserted in the intermediate language program immediately following an instruction that is last to write to the one of the caches; and translating the intermediate language program into a hardware description that specifies the plurality of caches, circuits for processing data in the caches, and for each of the caches a flush interface that initiates writing data from the cache to a memory structure in response to a respective flush signal, wherein timing of the respective flush signal as specified in the hardware description is determined based on placement of one of the one or more flush instructions in the intermediate language program.

2. The method of claim 1, further comprising:
compiling a portion of the HLL source code into software that is executable on a target processor that is coupled to the memory structure;
wherein the flush interface signals to the software executing on the target processor when the flush is complete, and the software reads data from the memory structure in response to the flush being complete.

3. The method of claim 2, wherein the flush interface is configured to store a token value in a designated location in the memory structure, and the token value in the designated location signals that the flush is complete.

4. The method of claim 3, wherein the compiling of the portion of the HLL source code into software includes creating a first thread that monitors the designated location for the token value, and the first thread activating a second thread for performing a software function in response to the token value in the designated location.

5. The method of claim 4, further comprising:
compiling a portion of the HLL source code into software that is executable on a target processor that is coupled to the memory structure; and
wherein the compiling the part of the HLL source code into an intermediate language program specifies a hardware function and the software calls the hardware function.

6. The method of claim 5, further comprising:
wherein at least one of the plurality of caches includes prefetch logic that is coupled to logic that implements the hardware function; and
wherein for the call to the hardware function by the software and the call to the hardware function specifying an input variable to the hardware function, the compiling of the portion of the HLL source code into software includes determining a last instruction to store to that variable before the call to the hardware function, and inserting, immediately following the last instruction to store to that variable, an instruction that signals to the prefetch logic to copy the variable from the memory structure to the one of the plurality of caches.

7. The method of claim 1, further comprising:
compiling a portion of the HLL source code into software that is executable on a target processor that is coupled to the memory structure; and
wherein the compiling the part of the HLL source code into an intermediate language program specifies a hardware function and the software calls the hardware function.

8. The method of claim 7, further comprising:
wherein at least one of the plurality of caches includes prefetch logic that is coupled to logic that implements the hardware function; and
wherein for the call to the hardware function by the software and the call to the hardware function specifying an input variable to the hardware function, the compiling of the portion of the HLL source code into software includes determining a last instruction to store to that variable before the call to the hardware function, and inserting, immediately following the last instruction to store to that variable, an instruction that signals to the prefetch logic to copy the variable from the memory structure to the one of the plurality of caches.

9. The method of claim 1, wherein the memory structure comprises one of the plurality of caches.

10. An electronic system, comprising:
a processor including a processor-local cache;
a main memory coupled to the processor, the main memory configured with software that is executable by the processor, the software including a call to a hardware function and accessing an address space; and
a function accelerator coupled to the main memory and configured to implement the hardware function and a plurality of caches, each cache dedicated to a particular region of the address space and including a flush interface that initiates transferring data from the cache to a memory structure in response to a respective flush signal that indicates writing of the data to the cache by the hardware function is complete, wherein timing of the respective flush signal is determined based on placement of one or more flush instructions in the software, and the flush interface is configured to signal to the software when the transfer is complete.

11. The system of claim 10, wherein the flush interface is configured to store a token value in a designated location in the main memory, and the token value in the designated location signals that the flush is complete.

12. The system of claim 11, wherein the software includes a first thread that monitors the designated location for the token value, and the first thread activating a second thread for performing a software function in response to the token value in the designated location.

13. The system of claim 12, further comprising:
wherein at least one of the plurality of caches includes prefetch logic that is coupled to logic that implements the hardware function; and
wherein the call to the hardware function specifies an input variable to the hardware function, and the software includes one or more instructions that signal to the prefetch logic to copy the variable from the main memory to the one of the plurality of caches, the one or more instructions immediately following a last instruction to store to the variable in the main memory before the call to the hardware function.

14. The system of claim 10, further comprising:
wherein at least one of the plurality of caches includes prefetch logic that is coupled to logic that implements the hardware function; and
wherein the call to the hardware function specifies an input variable to the hardware function, and the software includes one or more instructions that signal to the prefetch logic to copy the variable from the main memory to the one of the plurality of caches, the one or more instructions immediately following a last instruction to store to the variable in the main memory before the call to the hardware function.

15. The system of claim 10, wherein the function accelerator is a field programmable gate array.

16. A method for operating an electronic system, comprising:
executing software on a processor, the software including a call to a hardware function and accessing an address space;

initiating the hardware function on a function accelerator in response to the call to the hardware function by the software;

storing data accessed by the hardware function in a plurality of caches on the function accelerator, wherein each cache is dedicated to a particular region of the address space;

for each of the plurality of caches to which the hardware function stores data, generating a respective flush signal in response to a flush instruction in the software that follows an instruction in the software that is the last to store a data item in the cache by the hardware function; and transferring, in response to a respective flush signal to one of the plurality of caches, data from the one of the caches to a memory that is accessible to the software executing on the processor.

17. The method of claim 16, further comprising storing a token value in a designated location in the memory in response to the respective flush signal, the token value in the designated location indicating to software executing on the processor that the flush is complete.

18. The method of claim 17, further comprising
monitoring by a first software thread executing on the processor, the designated location for the token value;
activating a second software thread to execute on the processor by the first thread in response to the token value in the designated location; and
performing a software function by the second thread.

19. The method of claim 16, wherein the call to the hardware function specifies an input variable to the hardware function, and at least one of the plurality of caches includes prefetch logic that is coupled to logic that implements the hardware function, the method further comprising:
providing a prefetch signal from the software executing on the processor to the prefetch logic, the prefetch signal provided immediately following a last instruction to store to the variable in the memory before the call to the hardware function; and
copying the variable from the memory to the one of the caches by the prefetch logic in response to the prefetch signal.

20. The method of claim 16, wherein the function accelerator is a field programmable gate array.

* * * * *